United States Patent [19]

Takita

[11] Patent Number: 5,801,496
[45] Date of Patent: Sep. 1, 1998

[54] COLOR CATHODE RAY TUBE DISPLAY DEVICE AND METHOD OF ADJUSTING COLOR PURITY IN THE DISPLAY DEVICE

[75] Inventor: Hidenori Takita, Tokyo, Japan

[73] Assignee: Mitsubishi Denki Kabushiki Kaisha, Tokyo, Japan

[21] Appl. No.: 595,208

[22] Filed: Feb. 1, 1996

[30] Foreign Application Priority Data

Aug. 9, 1995 [JP] Japan .................... 7-203562

[51] Int. Cl.⁶ .............. G09G 1/28; G09G 1/04; H01J 31/26
[52] U.S. Cl. .............. 315/368.11; 315/10; 315/370
[58] Field of Search .................. 315/368.11, 10, 315/368.25, 370, 368.26, 368.27; 335/213

[56] References Cited

U.S. PATENT DOCUMENTS

| | | | |
|---|---|---|---|
| 3,668,464 | 6/1972 | Tokita et al. | 315/368.18 |
| 3,725,831 | 4/1973 | Barbin | 335/212 |
| 3,950,671 | 4/1976 | Ichigaya et al. | 315/370 |
| 4,456,853 | 6/1984 | Robinder et al. | 315/387 |
| 4,641,062 | 2/1987 | Pons | 315/370 |

FOREIGN PATENT DOCUMENTS 02-234591  9/1990  Japan .
4-227188   8/1992  Japan .
5-111042   4/1993  Japan .

OTHER PUBLICATIONS

IBM Technical Disclosure Bulletin, vol. 31, No. 12, May 1989.

*Primary Examiner*—Gregory C. Issing
*Attorney, Agent, or Firm*—Burns, Doane, Swecker & Mathis, LLP

[57] ABSTRACT

A color cathode ray tube display device has a cathode ray tube 1, a convergence purity assembly 10 mounted on a neck portion 29 of the tube 1 at a position behind a deflection yoke 8, a two pole coil unit 12 near the convergence purity assembly 10 to form a two pole magnetic field, a purity coil 13 wound around a cathode ray tube panel 3, and current supplying circuits 15 for supplying currents each being in synchronism with a vertical or horizontal deflection current. It further has a distributing device which detects portions of mislanding on the picture plane by the aid of another device and analyzes a result of the detection, and current control circuits 16 for controlling the currents to the two pole coil unit 12 and the purity coil 13 in accordance with an instruction from the distributing device. Mislanding can be corrected by adjusting the currents to the two pole coil unit 12 and the purity coil 13 in addition to adjustment of a ring 103 of the convergence purity assembly 10 and adjustment of a mounted position of the deflection yoke 8. Quantities to be adjusted are indicated by the distributing device, and therefore, an adjusting work for ITC can be easy.

14 Claims, 13 Drawing Sheets

PERIOD OF HORIZONTAL DEFLECTION SIGNAL

REFERENCE

CHANGE OF AMPLITUDE

INVERSION OF POLARITY

PHASE ERROR

FIGURE 5 (A′)

PERIOD OF HORIZONTAL
DEFLECTION SIGNAL

FIGURE 5 (B′)

PERIOD OF VERTICAL
DEFLECTION SIGNAL

FIGURE 6(A')

PERIOD OF VERTICAL DEFLECTION SIGNAL

FIGURE 6(B')

PERIOD OF HORIZONTAL DEFLECTION SIGNAL

FIGURE 7(A')

PERIOD OF VERTICAL DEFLECTION SIGNAL

FIGURE 7(B')

PERIOD OF VERTICAL DEFLECTION SIGNAL

TWO POLE PORTION OF CP-ASSY

MOUNTING POSITION OF DY

TWO POLE COIL UNIT

PURITY COIL

LANDING BEFORE CORRECTION

FIGURE 17
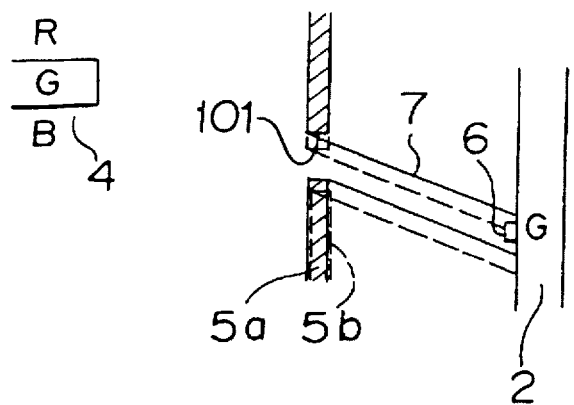
FIGURE 18(A)   FIGURE 18(B)
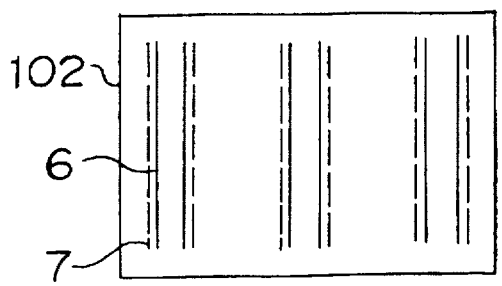   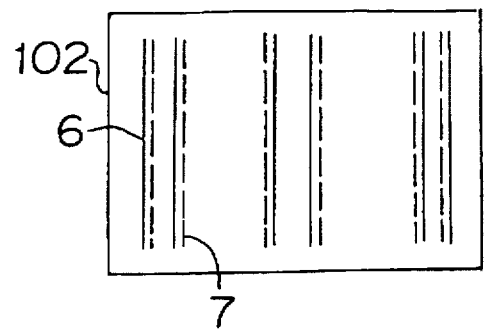
FIGURE 19(A)   FIGURE 19(B)
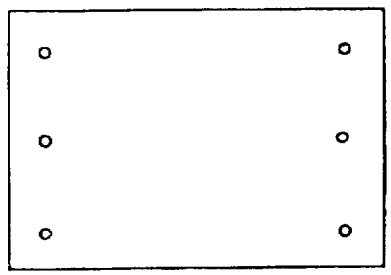   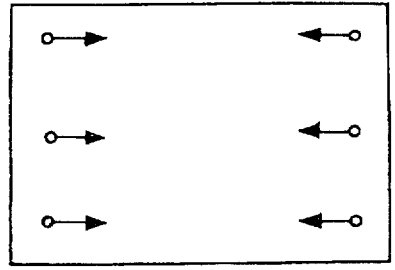

COLOR CATHODE RAY TUBE DISPLAY DEVICE AND METHOD OF ADJUSTING COLOR PURITY IN THE DISPLAY DEVICE

BACKGROUND OF THE INVENTION

1. Field of the Invention

The present invention relates to an improvement of color purity for a color cathode ray tube display device.

2. Discussion of Background

FIG. 14 is a partially cross-sectioned view of a conventional color cathode ray tube (hereinbelow, referred to as a CRT) display device similar to that disclosed in, for instance, Japanese Unexamined Patent Publication No. 111042/1993. In FIG. 14, reference numeral 1 designates a CRT, numeral 2 designates a dish-like panel and numeral 3 designates a funnel-like shaped funnel having a neck portion. The panel 2 and the funnel 3 are formed integrally of glass and constitutes an envelope 100 for the CRT 1. Numeral 4 designates an electron gun disposed in a neck portion 29 of the funnel 3 in the envelope 100, and numeral 5 designates an aperture grill of a partially cylindrical shape, which is arranged along the panel 2 in the envelope 100.

Fluorescent materials of three colors each emitting a blue color, a green color or a red color are coated on the inner surface of the panel 2. The electron gun 4 has three beam emission ports for emitting electron beams 7 (indicated by a dotted line) each of which irradiates a predetermined fluorescent material among three color fluorescent materials 6. A deflection yoke (hereinbelow, referred to as DY) 8 is mounted on the funnel 3 to make the electron beam 7 scan on the fluorescent materials 6. Numeral 10 designates a convergence purity assembly (hereinbelow, referred to as CP-ASSY). There are provided electronic circuits for generating vertical and horizontal scanning signals.

The operation of the conventional color cathode ray tube display device will be explained. The aperture grill 5 is generally called a color selection electrode and has a large number of cascade-like slits 101 which allow a portion of electron beams 7 emitted from the electron gun 4 to reach only the fluorescent material 6 having a predetermined color, and which inhibit another portion of electron beams 7 from impinging to the fluorescent material of the other colors, as shown in FIG. 15.

FIG. 16 shows a holding structure of the aperture grill made of a metallic material wherein reference numeral 9 designates a metallic frame. Since the aperture grill 5 blocks a certain portion of the electron beams, the temperature of the metallic aperture grill 5 is increased due to an impinging energy of the electron beams. Heat produced in the aperture grill is transmitted to the metallic frame 9 which holds the aperture grill 5 in a stretching state in the vertical direction as shown in FIG. 16, whereby the aperture grill 5 and the frame 9 expand outwardly in the circumferential direction due to thermal expansion, as indicated by arrow marks. Such phenomenon that the aperture grill 5 is expanded by heat in the circumferential direction due to the impinge of the electron beams is called aging.

FIG. 17 is a diagram showing a positional relationship between a fluorescent material 6 and an electron beam 7 before and after the aging. FIGS. 18A and 18B are diagrams showing respectively a positional relationship between fluorescent materials 6 and electron beams 7 in a case that they are observed from the outside of the panel 2 through a microscope (the positional relationship between the fluorescent materials and the electron beams observed by means of a microscope is opposite to that observed by naked eyes).

When the frame 9 is at a certain temperature, the aperture grill 5 is at a position 5a indicated by a solid line in FIG. 17, and the center of an electron beam 7 correctly impinges the center of a fluorescent material 6. In FIG. 18A showing the entirety of picture plane 102, the position 5a of the aperture grill 5 is just in such positional relationship that the center of an electron beam 7 emitted through the beam emitting port corresponding to a green color of the electron gun 4 impinges the center of the fluorescent material 6 emitting a green color. Such positional relationship is obtainable under conditions that DY8 and other elements are properly adjusted (explanation as to a relation of CRT and DY to a shift of the position of the electron beam will be made hereinafter).

When the temperature of the frame 9 is increased to such extent that there is aging, the aperture grill 5 expands to a position 5b as indicated by a dotted line in FIG. 17 with the result that the position of slits 101 is moved. Accordingly, the center of the electron beam 7 becomes off the center of the fluorescent material 6. The relation of the electron beam 7 to the fluorescent material 6 is shown by the position 5b in FIG. 17 and FIG. 18B. As is understood from FIG. 18B, when the position of the aperture grill 5 is shifted from the position 5a to the position 5b, the locus of the electron beam 7 after having passed through the slits 101 is shifted in parallel outwardly. An amount of parallel movement of the electron beam is larger as the beam passes through a slit at a position closer to an edge of the panel 2. Accordingly, correct impinge of the electron beam 7 to the fluorescent material 6 can not be obtained. Such phenomenon observed through a microscope is called an outside decreasing state.

An supplemental explanation will be made as to the electron beam 7 in order to assist understanding of the present invention. FIG. 18 shows a positional relationship observed through a microscope. In the observation through naked eyes, the electron beam shift outwardly with respect to the fluorescent material 6 when the aging of the frame 9 occurs, namely, the frame 9 expands. Such phenomenon is caused an inside decreasing state.

Hereinbelow, however, explanation will be made as to views observed through a microscope.

The positional relationship between fluorescent materials 6 and electron beams 7 shown in FIG. 18B is shown by using arrow marks as shown in FIG. 19B wherein the positions of the fluorescent materials 6 are determined as reference locations. FIGS. 18A and 18B respectively correspond to FIGS. 19A and 19B. In FIG. 19B, the end of each of the arrow marks is directed inwardly from outside starting points since the electron beams 7 are shifted inwardly with respect to the fluorescent materials 6 in FIG. 18B. Namely, FIG. 19A shows a just landing state (a properly impinging state) and FIG. 19B shows an outside decreasing state. (A degree of outside decreasing is generally expressed with μm in this field of technology.)

A positional relationship between CRT1 and DY8 is explained with use of FIGS. 20 and 21. When the position of DY8 in the axis of the cathode ray tube is proper, the electron beams are in just landing (properly impinges) on the fluorescent materials 6 as shown in FIG. 15, and the positions of the electron beams on the picture plane are as shown in FIG. 18A and 19A.

As the mounting position of DY8 is closer to the panel 2 (namely, as it is moved forwardly to the panel 2, specifically, is moved to a position 8a in FIG. 20) with respect to the proper position of it, the degree of outside decreasing (observed through a microscope) becomes large as shown in FIG. 20A and 20B.

On the other hand, as the mounting position of DY8 is closer to the electron gun 4 (namely, as it is moved to the rear side, specifically, is moved to a position 8a in FIG. 21), the degree of inside decreasing (observed through a microscope) becomes large as shown in FIG. 21A and 21B.

Then, explanation will be made as to correction of landing with use of two pole portions of CP-ASSY 10. FIG. 22A is a cross-sectional view of CRT1 at a portion where CP-ASSY 10 is mounted.

As shown in FIG. 22A, the electron beams 7 for producing red, green and blue colors undergo an electromagnetic force by the influence of a vertical magnetic field which is produced by permanent magnets of two poles in CP-ASSY 10 whereby a change of landing in a horizontal direction takes place as shown in FIG. 22B.

As described above, there is a change of landing due to the thermal expansion of the aperture grill 5 and the frame 9. There is also a change of landing due to an error of the mounting position of DY8 on CRT1. Further, there is a change of landing due to a fluctuation of adjustment of the two pole magnetic field of CP-ASSY 10 (the two pole portion comprises two ring-like magnetic plates 103, and the intensity of the magnetic field is adjusted by a degree of opening of each knob (not shown) attached to the outer periphery of each of the ring-like shape magnetic plates 103). In addition, there is a change of landing due to a fluctuation of light exposure (or a geomagnetism correction) to CRT. These changes of landing generally cause a mislanding state wherein the positions of the electron beams are not a just landing state as shown in FIG. 23.

Heretofore, correcting operations to obtain a just landing state have been carried out as follows. The frame 9 is sufficiently heated to have a proper temperature; the magnetic field formed by the two pole portions of CP-ASSY 10 is adjusted so that the center of the picture plane (i.e. a point ⑤ in FIG. 23) is rendered to be in a just landing state; the position of DY8 on CRT1 is adjusted so that edges of an X axis in the picture plane (i.e. points ④ and ⑥) are in a just landing state, and a small piece or pieces of permanent magnets 11 (they are generally called funnel magnets) are attached to the funnel 3 as shown in FIG. 24 if a slight mislanding state still remains.

The correcting operations for just landing at corner portions of the picture plane by the adjustment of CP-ASSY 10, the adjustment of the mounting position of DY8 and the adjustment by the attachment of the funnel magnet 11 (a series of the operations is generally called an ITC operation) have relied on experience and sense of operators. With respect to this, there have been proposed an adjustment of landing with use of a magnetic field produced by two poles disposed near CP-ASSY as shown in FIG. 1 through 3 in the above-mentioned Japanese Unexamined Patent Publication No. 111042/1993 and an adjustment of landing with use of a cancelling coil (hereinbelow, referred to as a purity coil) wound around a panel as disclosed in Japanese Unexamined Patent Publication No. 206297/1990.

With respect to the change of landing by the invention of Japanese Unexamined Patent Publication No. 111042/1993, however, points ①, ③, ④, ⑥, ⑦ and ⑨ on the picture plane shows an outside decreasing state (an inside decreasing state) as shown in FIG. 25 (there is no change concerning points ②, ⑤ and ⑧). In the invention disclosed in Japanese Unexamined Patent Publication No. 206297/1990, there is a change of rotation of points ① through ③ and ⑦ through ⑨ (there is no change of points ④ through ⑥) as shown in FIG. 26. Since the former is to correct the mislanding due to a change of aging and the later is to correct the mislanding due to an error caused by the application of an outer magnetic field, it is difficult to eliminate the errors resulted from the above-mentioned causes in spite of the inventions disclosed in the publications, and accordingly, the ITC operations which rely on the experience and the sense of the operators are still necessary; hence, it is difficult to correct the errors except for well skilled persons.

Thus, adjusting operations of landing (ITC operations) for a CRT due to an insufficient adjustment of CP-ASSY, an insufficient adjustment of the mounting position of DY on the CRT, a fluctuation of aging time and a fluctuation of light exposure require a skilled person and a complicated work since the conventional color cathode ray tube display device has the above-mentioned structure.

SUMMARY OF THE INVENTION

The present invention is to eliminate the above-mentioned problems and to provide a color cathode ray tube display device which allows an unskilled operator to perform easily ITC operations.

Further, it is an object of the present invention to provide a method of adjusting color purity in a color cathode ray tube display device.

According to the present invention, there is provided a color cathode ray tube display device comprising a color cathode ray tube having a panel portion on which a picture image is projected and a neck portion disposed at the rear side of the panel portion, which includes three electron guns corresponding respectively to three colors of R, G and B and which is attached with a convergence purity assembly at its outer portion, and a deflection signal generating circuit for supplying a horizontal deflection signal and a vertical deflection signal to the color cathode ray tube, the color cathode ray tube display device being characterized by comprising a two pole coil unit which comprises two coils disposed rear the convergence purity assembly so as to face each other so that the direction of magnetic lines of force generated from them is in perpendicular to a plane including the three electron guns, a purity coil wound around the panel portion, and a current supplying circuit for supplying a current of saw-tooth-like waveform or a current of parabolic waveform, which has the same period as either the horizontal deflection signal or the vertical deflection signal of the color cathode ray tube display device, to at least one of the two pole coil unit and the purity coil.

In accordance with the present invention, there is provided a method of adjusting color purity of a color cathode ray tube display device comprising a step of obtaining data of directions of mislanding for each position on a picture plane by using a mislanding measuring means, a step of calculating a quantity of adjustment on a convergence purity assembly, a quantity of adjustment on the position of a deflection yoke and quantities of current to be supplied to a two pole coil unit and a purity coil on the basis of the data, and a step of supplying currents to the two pole coil unit and the purity coil on the basis of a result of the calculation.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 17 is a diagram for explaining a change by aging;

FIGS. 18A and 18B are diagrams showing a positional relationship between electron beams and fluorescent materials;

FIGS. 19A and 19B are diagrams showing a positional relationship (mislanding) between the electron beams and the fluorescent materials;

DETAILED DESCRIPTION OF PREFERRED EMBODIMENTS

Figure 1:
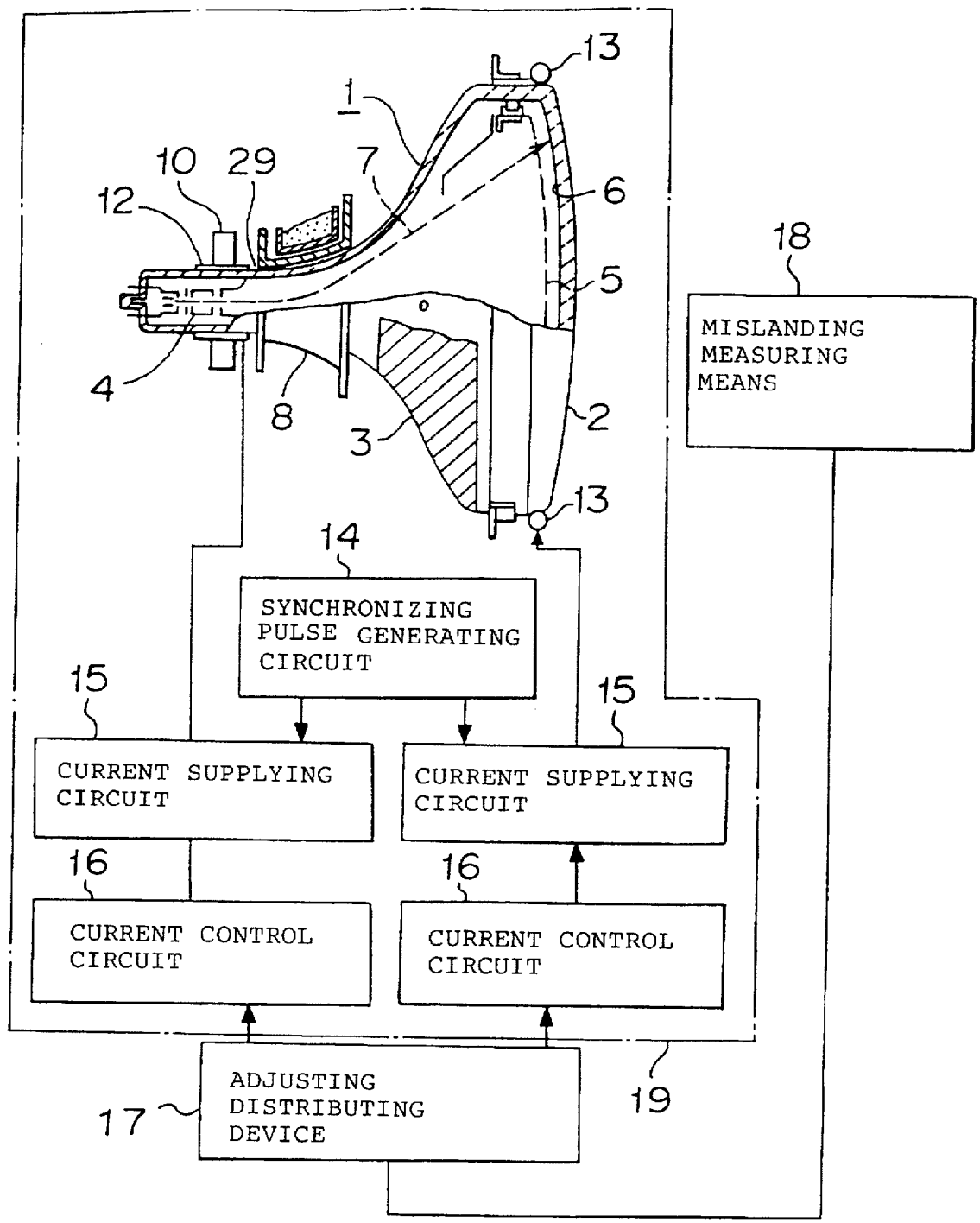
FIG. 1 is a diagram showing a first embodiment of the color cathode ray tube display device according to the present invention.

Preferred embodiments of the present invention will be described with reference to the drawings wherein the same reference numerals designate the same or corresponding parts.

The present invention is practiced as a device assembled in a color cathode ray tube display device.

A first embodiment of the present invention will be described with reference to FIGS. 1 through 4. In FIG. 1 showing an important portion of the first embodiment, reference numeral 1 designates a cathode ray tube (CRT), numeral 4 designates an electron gun, numeral 7 designates an electron beam, numeral 8 designates a deflection yoke (hereinbelow, referred to as DY), numeral 10 designates a convergence purity assembly (hereinbelow, referred to as CP-ASSY) and numeral 19 designates the entirety of a color cathode ray tube display device.

A two pole coil unit 12 is mounted on the CRT in the vicinity of the CP-ASSY 10 so as to produce a magnetic field wherein magnetic lines of force extend in the vertical direction. An example of the structure of the two pole coil unit is shown in FIG. 2.

A purity coil 13 is wound around a CRT panel 2. A synchronizing pulse generating circuit 14 generates a pulse signal. Current supplying circuits 15 supply to the two pole coil unit 12 and the purity coil 13 currents in synchronism with the horizontal deflection current or the vertical deflection current on the basis of the pulse signal.

A mislanding measuring means 18 (which may be a manual or automatic measuring device commercially available) is disposed facing the picture plane 2 of the color cathode ray tube display 19 to collect data of mislanding. Data of mislanding are supplied to a adjusting-distributing device 17, which determines a current feeding rate to two pole portion of the CP-ASSY 10 and the two pole coil unit 12, and a current feeding rate to the purity coil 13 in order to correct quantities of mislanding.

Figure 2A:
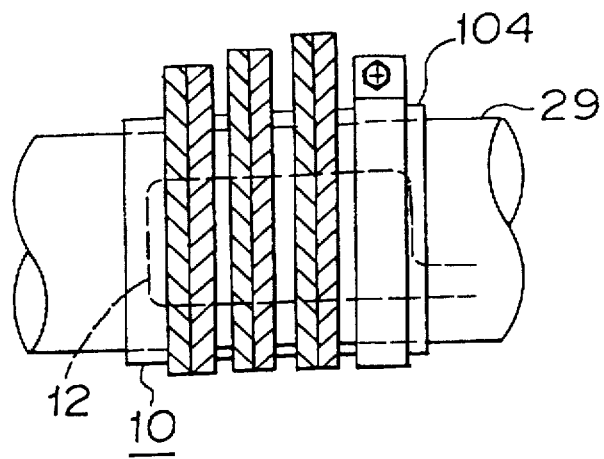
FIGS. 2A and 2B are diagrams showing a two pole coil unit used in the display device shown in FIG. 1.
Figure 2B:
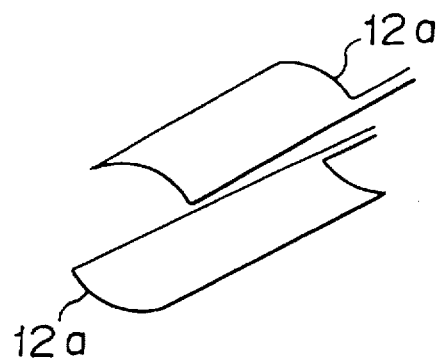

FIG. 2A is a construction view wherein the two pole coil unit 12 is embedded in a holder 104 in the CP-ASSY 10. FIG. 2B shows the two pole coil unit 12 which consists of a pair of coils 12a, 12a.

Figure 3A:
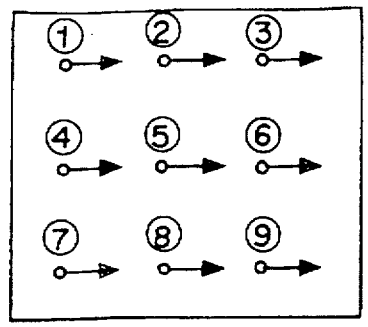
FIGS. 3A through 3E are diagrams showing changes of landing resulted in the display device shown in FIG. 1, and a current waveform supplied to the two pole coil unit and a purity coil, the current waveform causing a change of landing.
Figure 3B:
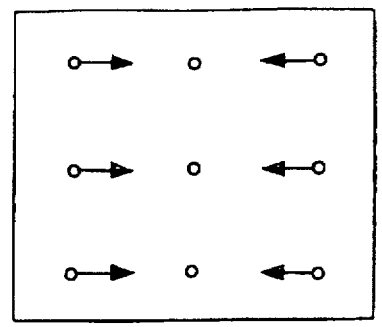
Figure 3C:
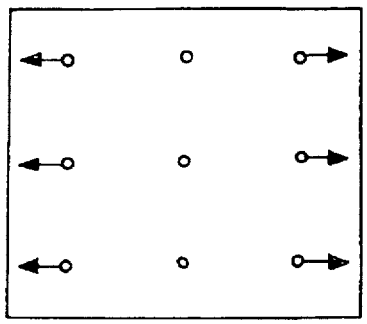
Figure 3D:
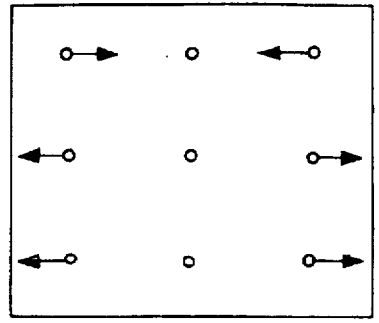
Figure 3E:
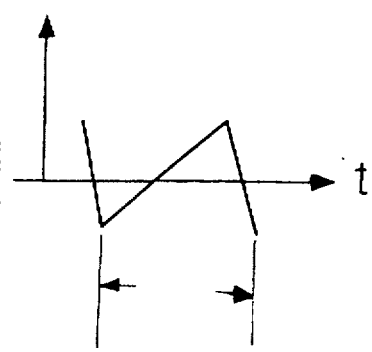

The operation of the first embodiment of the present invention will be described. When the waveforms of currents supplied to the two pole coil unit 12 and the purity coil 13 are respectively a saw-tooth-like waveform having a period of horizontal deflection current as shown in FIG. 3E, changes of landing occurring in this case are respectively shown in FIGS. 3C and 3D. On the other hand, there are changes of landing as in FIGS. 3A and 3B depending on an adjustment of the ring-shaped magnetic plates 103 in the CP-ASSY 10 and an adjustment of position of the DY. Namely, there are several sets of combination of the changes shown in FIGS. 3A through 3D.

Data of mislanding obtained by measuring mislanding on the picture plane are decomposed into components as shown in FIGS. 3A through 3D. The adjusting-distributing device 17 analyzes a quantity of adjustment of the two pole portion of the CP-ASSY 10, a quantity of the adjustment of the mounting position of the DY8 and current feeding rates to be supplied to the two pole coil unit 12 and the purity coil 13, and provides instructions to current control circuits 16 so as to control the current supplying circuits 15 whereby adjustment to the adjustable elements can be performed.

The function of the adjusting·distributing device 17 will be described. As described above, FIGS. 3A through 3D show changes of landing corresponding to the four adjustable elements. For more detailed explanation, symbols for explanation are put in FIG. 12.

Figure 12A:
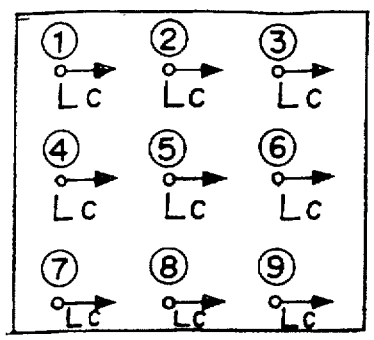
FIGS. 12A through 12D are diagrams showing changes of landing with explanation taken place in the display device shown in FIG. 1.
Figure 25:
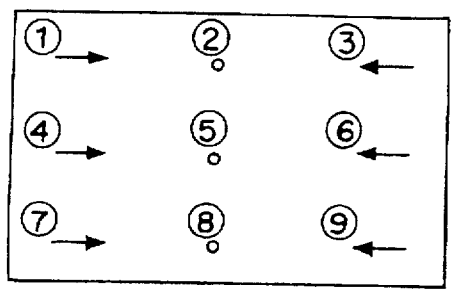
FIG. 25 is a diagram showing a change of landing by using a two pole coil unit.
Figure 26:
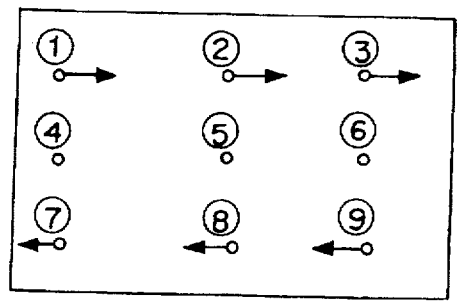
FIG. 26 is a diagram showing a change of landing by using a purity coil.

A change of landing caused by the two pole portion 103 of the CP-ASSY 10 shows the same change at all positions as shown in FIG. 12A (the position of measuring points on the screen is shown in FIG. 25).

Figure 12B:
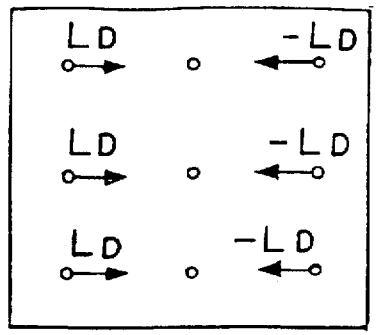

A change of landing caused by changing the mounting position of the DY8 is shown in FIG. 12B wherein there is a change LD (μm) at a point ①, ④ or ⑦; there is a change of −LD at a point ③, ⑥ or ⑨, and there is no change at a point ②, ⑤ or ⑧.

Figure 12C:
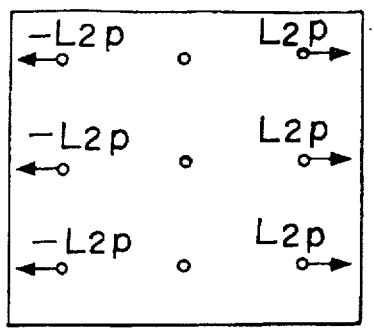

A change of landing caused by the two pole coil unit is shown in FIG. 12C wherein there is a change of −L2P (μm) at a point ①, ④ or ⑦; there is a change of L2P at a point ③, ⑥ or ⑨, and there is no change at a point ②, ⑤ or ⑧.

Figure 12D:
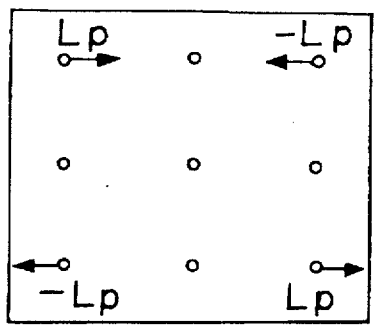

A change of landing caused by changing a current feeding rate to the purity coil 13 is shown in FIG. 12D wherein there is a change of LP at a point ① or ⑨; there is a change of −LP at a point ③ or ⑦; and there is no change at a point ②, ④, ⑤, ⑥ or ⑧.

When such changes of landing caused by the two pole portion 103 of the CP-ASSY 10, the mounting position of the DY8 and the current feeding rates to the two pole coil unit 12 and the purity coil 13 are synthesized, a synthesized quantity at each point on the screen (for instance, ΔL① to point ①) is expressed by the following formulas (1):

Point ①=LC+LD−L2P+LP

Point ②=LC

Point ③=LC−LD+L2P−LP

Point ④=LC+LD−L2P

Point ⑤=LC (1)

Point ⑥=LC−LD+L2P

Point ⑦=LC+LD−L2P−LP

Point ⑧=LC

Point ⑨=LC−LD+L2P+LP

From the above-mentioned formulas (1), the adjustment of the position of ②, ⑤ and ⑧ in the picture plane can be conducted only by the two pole portion 103 of the CP-ASSY 10. Accordingly, the value of LC can be simply determined from ΔL②, ΔL⑤ and ΔL⑧ among the obtained data concerning mislanding.

Then, a shift of data at a point (④ or ⑥ can be obtained by synthesizing only the values of LD and L2P when the value LC is excluded and has no relation to LP. Accordingly, LD and L2P may be respectively or independently changed to shift the direction in order to obtain convergence. Or, the values of LD and L2P can be obtained by solving simultaneous equations from the data on the positions ①, ③, ⑦ and ⑨. When the values LC, LD and L2P are obtained, LP can be simply determined from formulas (1).

Figure 13:
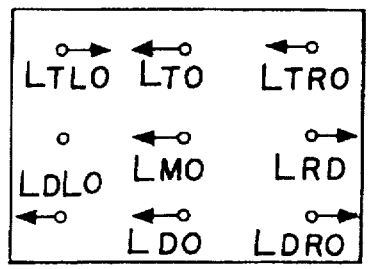
FIG. 13 is a diagram for explaining a state of landing before adjustment.
Figure 14:
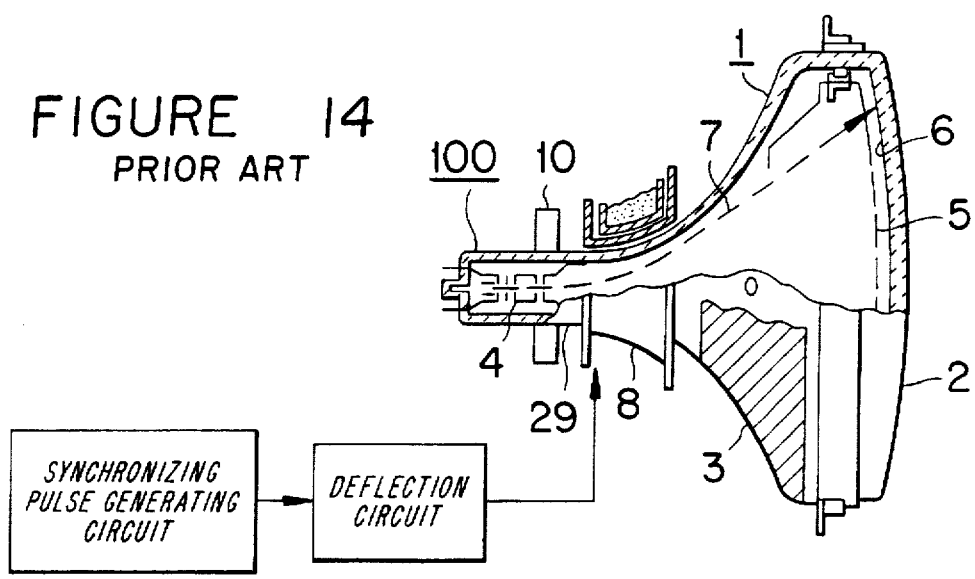
FIG. 14 is a front view partly cross-sectioned of a cathode ray tube used in a conventional color cathode ray tube display device.
Figure 15:
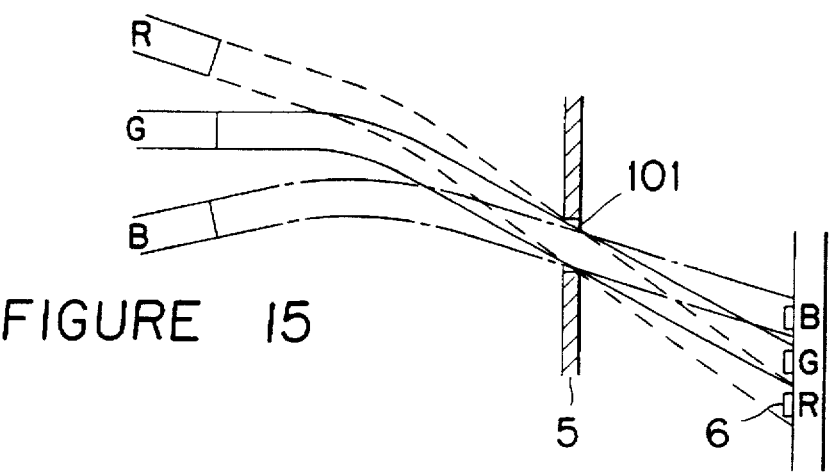
FIG. 15 is a diagram for explaining a color selecting function by an aperture grill.
Figure 16:
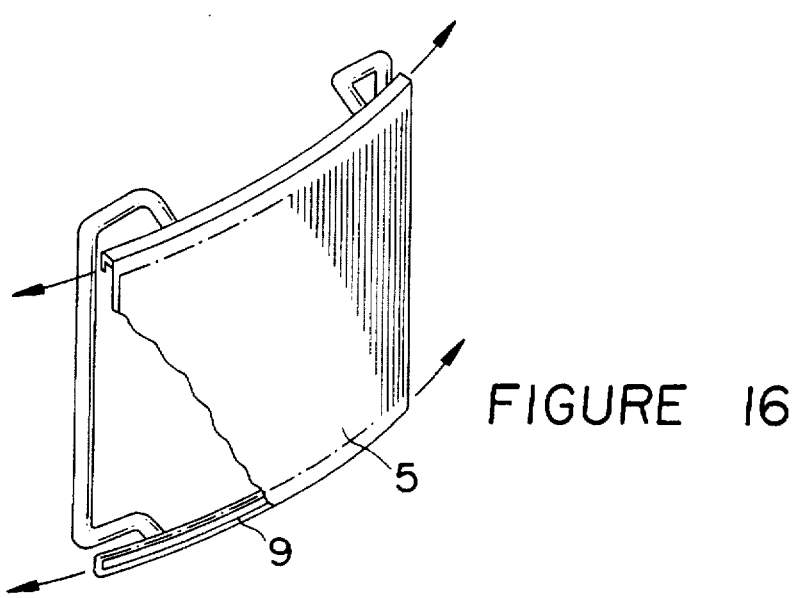
FIG. 16 is a diagram showing a construction of a frame and a grill.
Figure 20A:
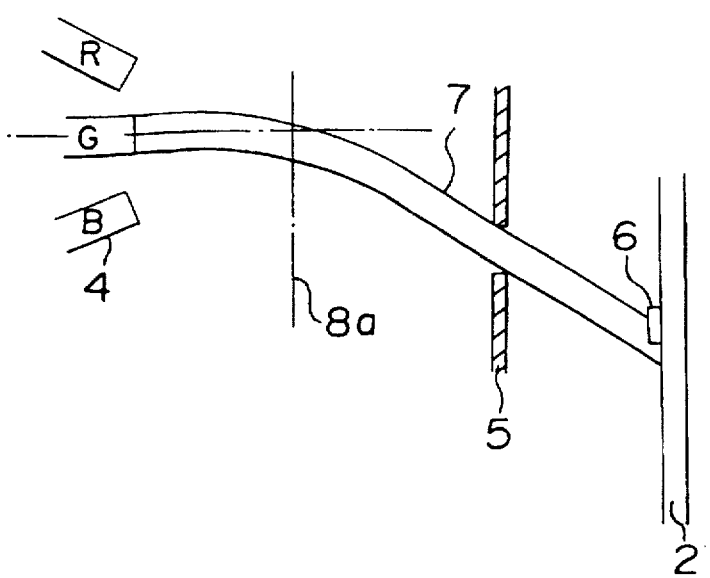
FIGS. 20A and 20B are diagrams showing a state of mislanding on a picture plane.
Figure 20B:
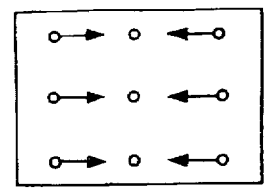
Figure 21A:
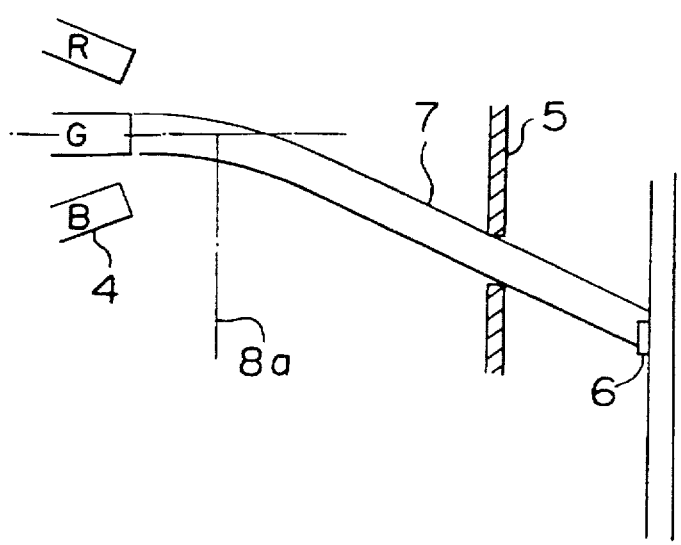
FIGS. 21A and 21B are diagrams explaining a state of mislanding between locuses of electron beams and points on a picture plane.
Figure 21B:
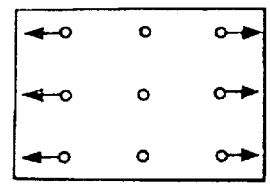
Figure 22:
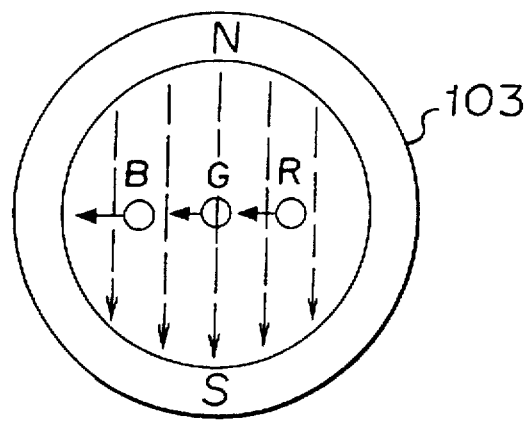
FIGS. 22A and 22B are diagrams showing a change of landing caused by the influence of a magnetic field.
Figure 22:
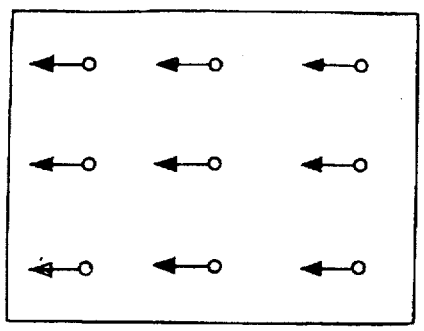
Figure 23:
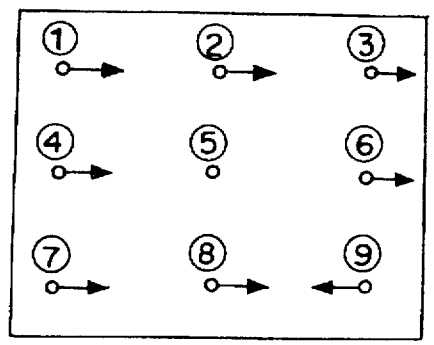
FIG. 23 is a diagram showing a mislanding pattern resulted from a fluctuation of manufacturing a cathode ray tube.
Figure 24:
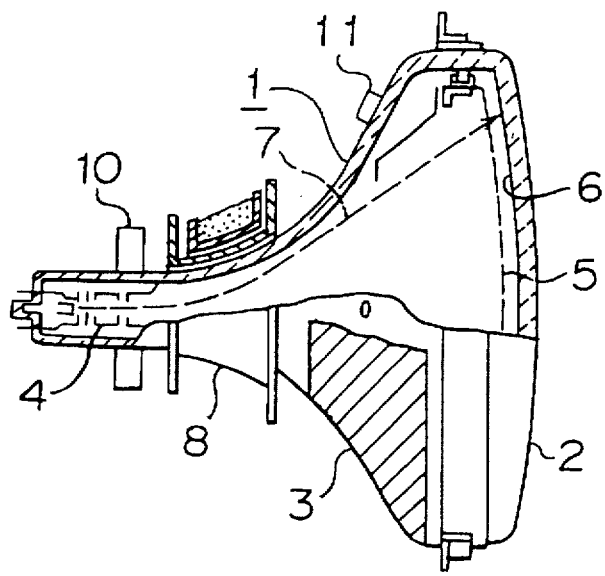
FIG. 24 is a front view partly cross-sectioned of a cathode ray tube attached with a funnel magnet.

A value obtained by synthesizing the quantity of change by the above-mentioned adjustment of landing at each position and the data before correction as shown in FIG. 13 is a value of landing after adjustment.

Figure 4:
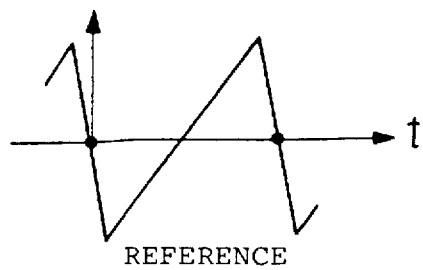
FIGS. 4A through 4D are diagrams showing the amplitude, the polarity and the phase of a current supplied to the two pole coil unit and the purity coil in the display device shown in FIG. 1.
Figure 4:
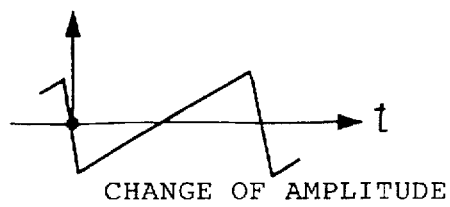
Figure 4:
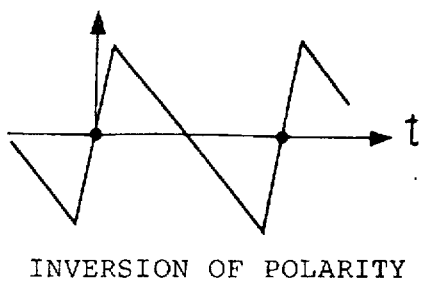
Figure 4:
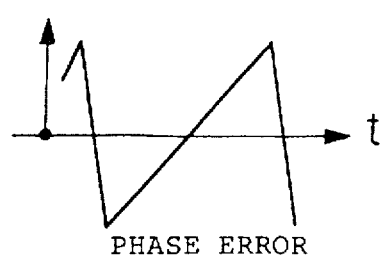

FIGS. 4A through 4D are diagrams showing waveforms of currents supplied to the two pole coil unit 12 and the purity coil 13 wherein FIG. 4A shows a reference waveform and FIGS. 4B, 4C and 4D respectively show the amplitude, the polarity and the phase of current waveform. With respect to the FIGS. 4, when the waveforms of FIG. 4B, FIG. 4C and FIG. 4D can be made variable, a quantity of mislanding which can not be adjusted in the ITC operations can be minimized.

In this embodiment, explanation has been made as to the CRT with an aperture grill. However, a CRT with a shadow mask may be used. In this case, the same effect as the first embodiment can be obtained by disposing each pair of two pole coils for vertical deflection and horizontal deflection instead of the two pole coil unit 12 shown in FIG. 2 so that a proper correcting current is supplied.

Figure 5:
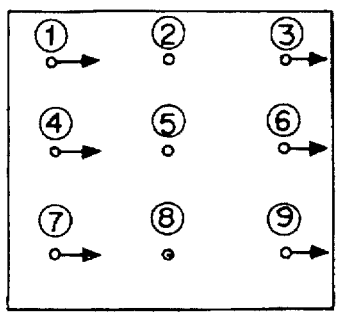
FIGS. 5A, 5A', 5B and 5B' are diagram showing current waveforms supplied to the two pole coil unit and the purity coil and changes of landing in a second embodiment of the color cathode ray tube display device according to the present invention.
Figure 5:
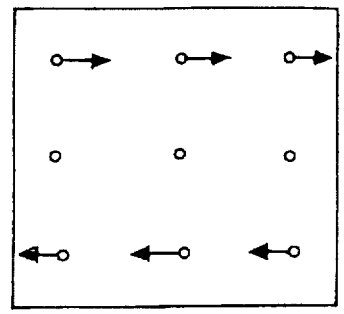
Figure 5:
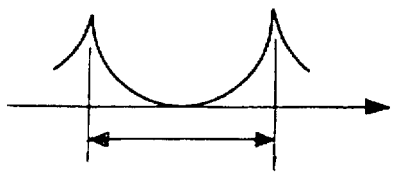
Figure 5:
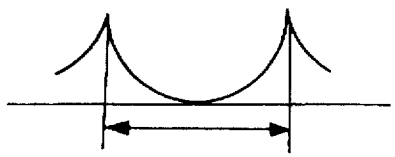

A second embodiment of the present invention will be described. FIGS. 5A and 5B respectively show changes of landing when a current of a parabola waveform which is in synchronism with the horizontal deflection signal is supplied to the two pole coil unit 12 and a current having a parabola waveform in synchronism with the vertical deflection signal is supplied to the purity coil 13 as shown in FIGS. 5A' and 5B'. In this case, the term "synchronism" means the currents have the same period and synchronism.

Adjustment and distribution in the second embodiment are conducted in the adjustment of the two pole portion 103 of the CP-ASSY 10 (FIG. 3A), the adjustment of the mounting position of the DY8 (FIG. 3B) and the current having a horizontal deflection frequency to the two pole coil unit 12 and the current having a vertical deflection frequency to the purity coil 13 (FIGS. 5A' and 5B').

A third embodiment of the present invention will be described with reference to FIGS. 6A, 6A', 6B and 6B'.

Figure 6A:
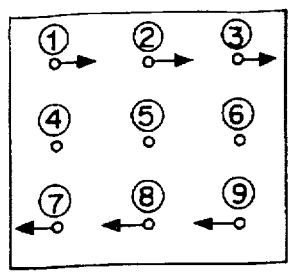
FIGS. 6A, 6A', 6B and 6B' are diagrams showing current waveforms supplied to the two pole coil unit and the purity coil and changes of landing in a third embodiment of the present invention.
Figure 6B:
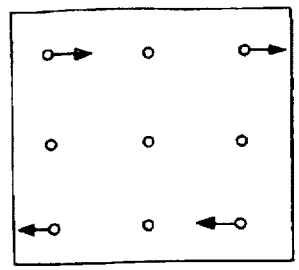
Figure 6B:
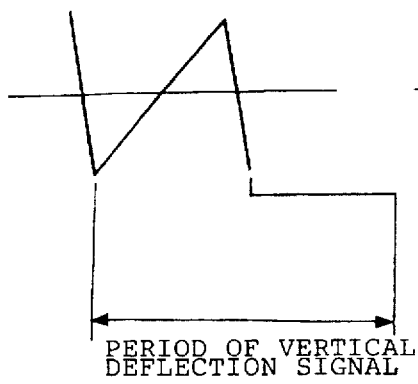
Figure 6B:
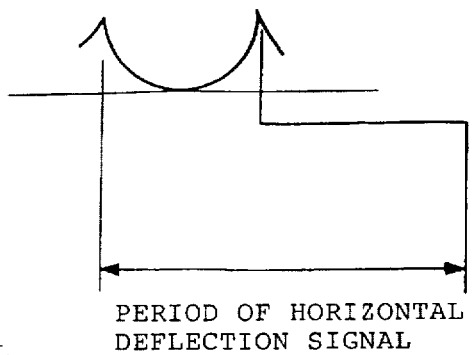

FIGS. 6A and 6B respectively show changes of landing when a current having a saw-tooth-like waveform in synchronism with the vertical deflection signal (FIG. 6A') is supplied to the two pole coil unit 12 and a current having a parabola waveform in synchronism with the horizontal deflection signal (FIG. 6B') is supplied to the purity coil 13.

Adjustment and distribution in the third embodiment are conducted in the adjustment of the two pole portion of the CP-ASSY (FIG. 3A), the adjustment of the mounting position of the DY (FIG. 3B), a current of a vertical deflection period to the two pole portion and a current of a horizontal deflection period to the purity coil (FIGS. 6A' and 6B').

A fourth embodiment of the present invention will be described with reference to FIGS. 7A, 7A', 7B and 7B'.

Figure 7A:
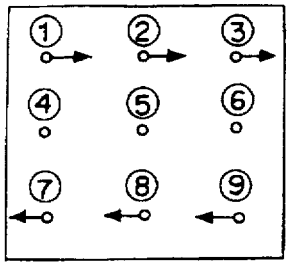
FIGS. 7A, 7A', 7B and 7B' are diagrams showing current waveforms supplied to the two pole coil unit and the purity coil and changes of landing in a fourth embodiment of the present invention.
Figure 7B:
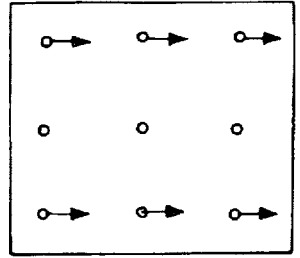
Figure 7B:
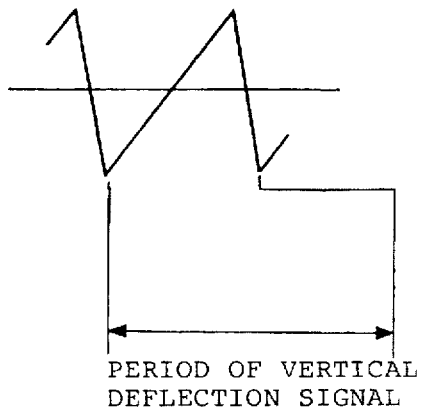
Figure 7B:
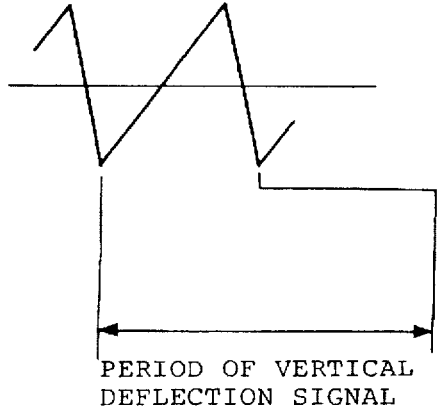

FIGS. 7A and 7B respectively show changes of landing when currents having a saw-tooth-like waveform each in synchronism with a vertical deflection signal (FIGS. 7A' and 7B') are supplied respectively to the two pole coil unit 12 and the purity coil 13.

Adjustment and distribution in the fourth embodiment are conducted in the adjustment of the two pole portion of the CP-ASSY (FIG. 3A), the adjustment of the mounting position of the DY (FIG. 3B), a current in synchronism with the vertical deflection period to the two pole coil unit 12 and a current in synchronism with the vertical deflection period to the purity coil 13.

A fifth embodiment of the present invention will be described.

Figure 8:
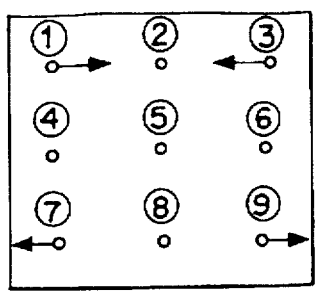
FIGS. 8A, 8B and 8C are diagrams showing a current waveform supplied to the two pole coil unit and the purity coil and changes of landing in a fifth embodiment of the present invention.
Figure 8:
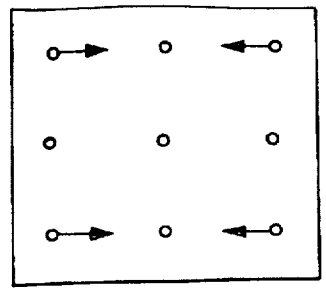
Figure 8:
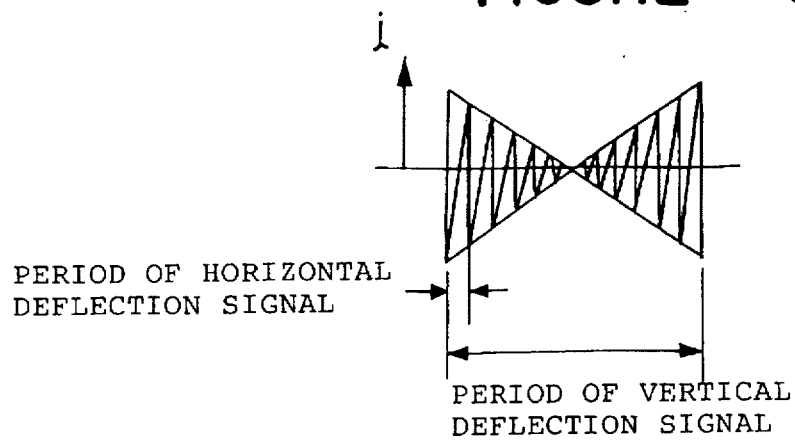

FIGS. 8A and 8B respectively show changes of landing when each current having a waveform which is in synchronism with both the horizontal deflection signal and the vertical deflection signal (the waveform being obtained by synthesizing the waveform of the signals or by the amplitude modulation of the horizontal scanning signal with the vertical scanning signal) is respectively supplied to the two pole coil unit 12 or the purity coil 13. FIG. 8C shows the current waveform.

Adjustment and distribution in the fifth embodiment are conducted in the adjustment of the two pole portion of the CP-ASSY (FIG. 3A), the adjustment of the mounting position of the DY (FIG. 3B) and the current value shown in FIG. 8C.

A sixth embodiment of the present invention will be described.

Figure 9:
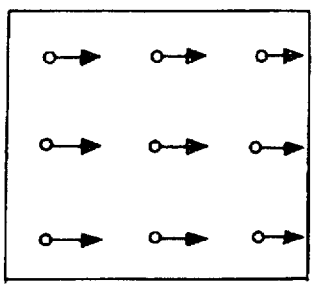
FIGS. 9A, 9B and 9C are diagrams showing a current waveform supplied to the two pole coil unit and the purity coil and changes of landing in a sixth embodiment of the present invention.
Figure 9:
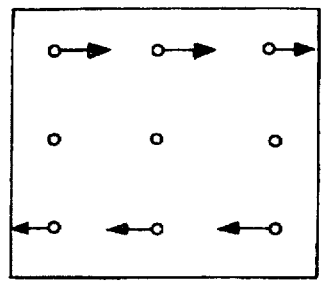
Figure 9:
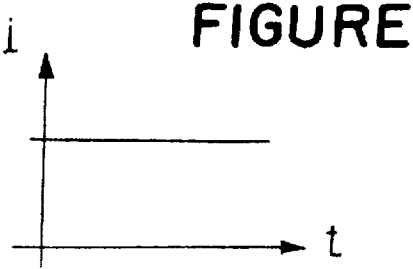

FIGS. 9A and 9B respectively show changes of landing when a direct current is supplied to the two pole coil unit and the purity coil respectively.

Adjustment and distribution in the sixth embodiment are conducted in the adjustment of the two pole portion of the CP-ASSY (FIG. 3A), the adjustment of the mounting position of the DY (FIG. 3B) and the current value shown in FIG. 9C. In this case, it is not always necessary to supply the current to both the coils, and there is a case that adjustment can be performed by supplying a current to either of the coils.

A seventh embodiment of the present invention will be described.

Figure 10:
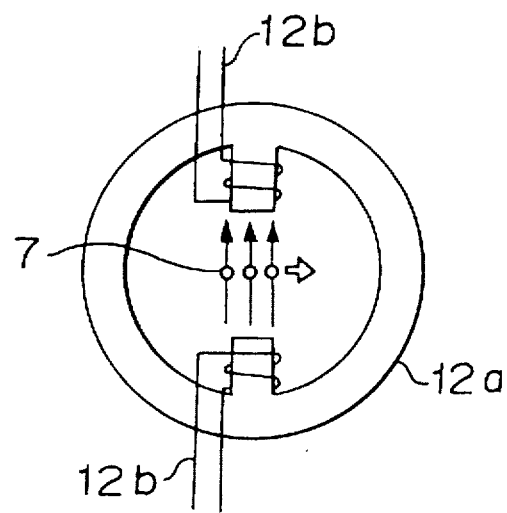
FIG. 10 is a diagram showing the construction of the two pole coil unit in a seventh embodiment of the present invention.

FIG. 10 shows another embodiment of the two pole coil unit mounted on the color cathode ray tube. The two pole coil unit has a ring-like ferrite core 12a wherein two projections are extended inwardly from the inner circumference of the core in an opposing state and two coils 12b are wound around the projections. The two pole coil unit is disposed in the vicinity of the CP-ASSY 10.

Figure 11:
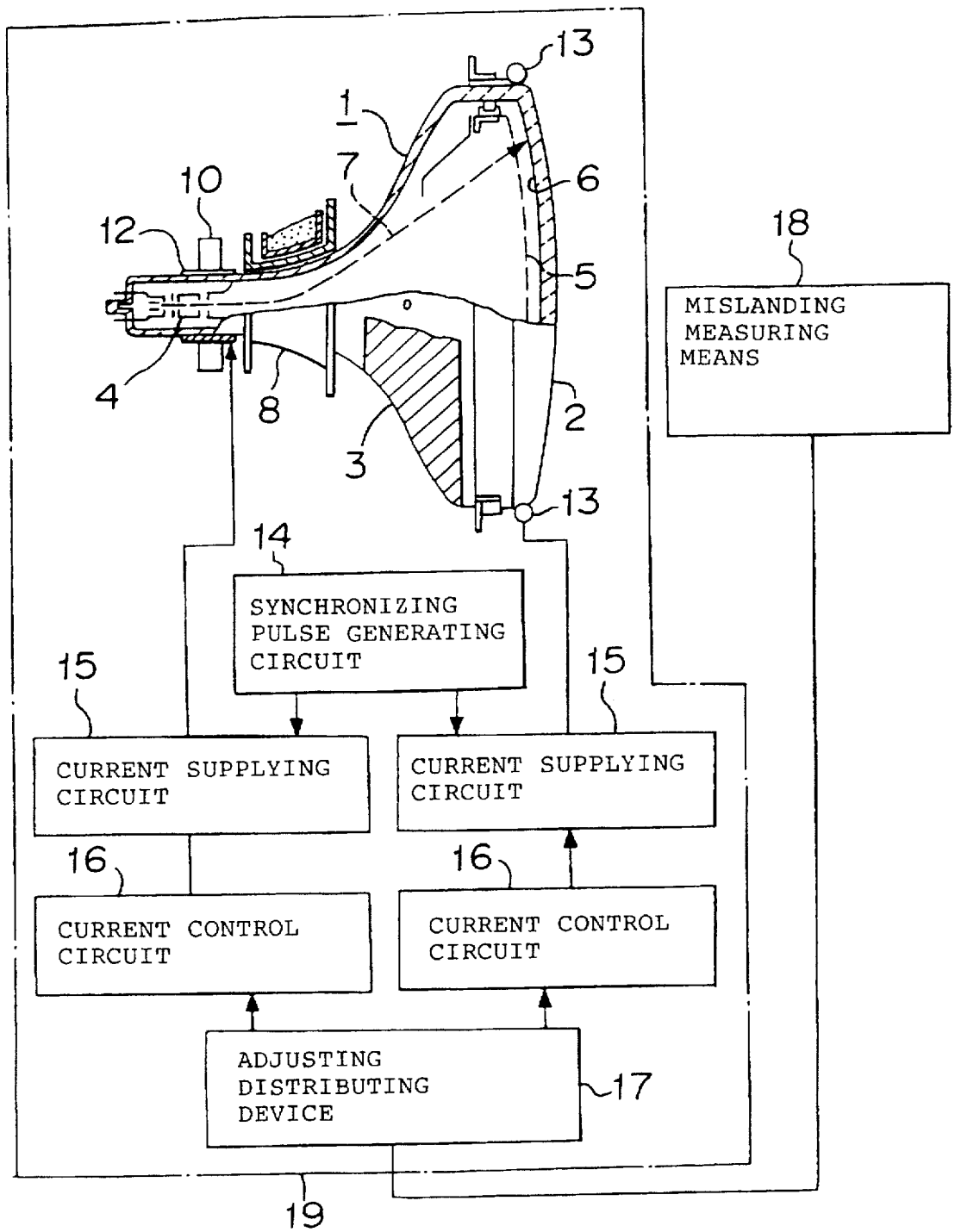
FIG. 11 is a diagram showing an eighth embodiment of the color cathode ray tube display device of the present invention wherein an adjusting-distributing device is included in the display device.

An eighth embodiment of the present invention is shown in FIG. 11. In the first embodiment shown in FIG. 1, an intelligent device such as a personal computer is used as the adjusting-distributing device 17 which adjusts and distributes data of mislanding, and an output from the adjusting-distributing device 17 is input to the color cathode ray tube display device 19. However, in the embodiment shown in FIG. 11, the adjusting-distributing device 17 is included in the color cathode ray tube display device 19.

Thus, in accordance with the inventions defined in claims 1 through 11, the ITC operations on the adjustment of a two pole portion in a CP-ASSY, the adjustment of the mounting position of a DY, a current feeding rate to a two pole coil unit, a current feeding rate to a purity coil can be conducted depending on quantities of adjustment and distribution which are determined by analyzing data of mislanding which are obtainable at a front surface of the picture plane. Accordingly, ITC operations can be easy even by an unskilled person.

According to the invention claimed in claim 2, any work after the adjustment is unnecessary since an adjusting-distributing device stores data of adjustment and and distribution obtained by the data of mislanding, and controls current feeding rates to the two pole coil unit and the purity coil base on the stored data.

According to the inventions claimed in claims 3 to 8, adjustment of mislanding based on a specified factor of error is possible.

According to the invention claimed in claim 9, a two pole coil unit having a thin thickness in the axial direction of the cathode ray tube is used whereby the unit is easily accommodated to the neck portion of a cathode ray tube.

According to the invention claimed in claim 10, since a two pole coil unit is sufficiently accommodated in a holder in a CP-ASSY, a conventional CRT can be utilized.

According to the invention claimed in claim 11, color purity can be adjusted without skill when the adjusting operations are conducted according to a written manual.

Obviously, numerous modifications and variations of the present invention are possible in light of the above teachings. It is therefore to be understood that within the scope of the appended claims, the invention may be practiced otherwise than as specifically described herein.

What is claimed is:

1. A color cathode ray tube display device comprising:
   a color cathode ray tube having a panel portion on which a picture image is projected and a neck portion disposed at the rear side of the panel portion, which includes three electron guns corresponding respectively to three colors of R, G and B and which is attached with a convergence purity assembly at its outer portion;
   a deflection signal generating circuit for supplying a horizontal deflection signal and a vertical deflection signal to the color cathode ray tube;
   a two pole coil unit which comprises two coils disposed rear the convergence purity assembly so as to face each other so that the direction of magnetic lines of force generated from them is in perpendicular to a plane including the three electron guns;
   a purity coil wound around the panel portion; and
   a current supplying circuit for supplying a current of saw-tooth-like waveform or a current of parabolic waveform, which has the same period as either the horizontal deflection signal or the vertical deflection signal of the color cathode ray tube display device, to the two pole coil unit and the purity coil.

2. A color cathode ray tube display device according to claim 1, wherein the two pole coil unit comprises a ring-like ferrite core disposed around the neck portion of the cathode ray tube and two coil portions wound around projections projecting inwardly from the inner periphery of the ring-like ferrite core.

3. A color cathode ray tube display device according to claim 1, wherein the two pole coil unit is held in a holder mounted on the neck portion of the color cathode ray tube.

4. A color cathode ray tube display device comprising:
   a color cathode ray tube having a panel portion on which a picture image is projected and a neck portion disposed at the rear side of the panel portion, which includes three electron guns corresponding respectively to three colors of R, G and B and which is attached with a convergence purity assembly at its outer portion;
   a deflection signal generating circuit for supplying a horizontal deflection signal and a vertical deflection signal to the color cathode ray tube;
   a two pole coil unit which comprises two coils disposed rear the convergence purity assembly so as to face each other so that the direction of magnetic lines of force generated from them is in perpendicular to a plane including the three electron guns;
   a purity coil wound around the panel portion;
   a current supplying circuit for supplying a current of saw-tooth-like waveform or a current of parabolic waveform, which has the same period as either the horizontal deflection signal or the vertical deflection signal of the color cathode ray tube display device, to at least one of the two pole coil unit and the purity coil; and an adjusting-distributing device which is so adapted as to determine a ratio of currents to be supplied to the two pole coil unit and the purity coil on the basis of directions of mislanding at positions of the picture plane, which are obtained by a mislanding measuring means disposed outside the display device; to store the ratio of currents determined, and to instruct to current supplying circuits the ratio of currents to be supplied to the two pole coil unit and the purity coil.

5. A color cathode ray tube display device according to claim 4, wherein the current supplying circuits control the currents supplied to the two pole coil unit and the purity coil so that the currents respectively have a saw-tooth-like waveform which has the same period as the horizontal deflection signal.

6. A color cathode ray tube display device according to claim 4, wherein the current supplying circuits control the currents in a manner that a current supplied to the two pole coil unit has a parabolic waveform which has the same period as the horizontal deflection signal, and a current supplied to the purity coil has a parabolic waveform which has the same period as the vertical deflection signal.

7. A color cathode ray tube display device according to claim 4, wherein the current supplying circuits control the currents in a manner that a current supplied to the two pole coil unit has a saw-tooth-like waveform which has the same period as the vertical deflection signal, and a current to the purity coil has a parabolic waveform which has the same period as the horizontal deflection signal.

8. A color cathode ray tube display device according to claim 4, wherein the current supplying circuits control the currents supplied to the two pole coil unit and the purity coil so that the currents respectively have a saw-tooth-like waveform which has the same period as the vertical deflection signal.

9. A color cathode ray tube display device according to claim 4, wherein the current supplying circuits control the currents supplied to the two pole coil unit and the purity coil in a manner that the currents respectively form a signal obtained by superimposing the vertical deflection signal on the horizontal deflection signal, or a signal obtained by the amplitude modulation of the saw-tooth-like waveform having the same period as the horizontal deflection signal by the parabolic waveform having the same period as the vertical deflection signal.

10. A color cathode ray tube display device according to claim 4, wherein the current supplying circuits control so that a direct current is supplied to either the two pole coil unit or the purity coil.

11. A color cathode ray tube display device according to claim 4, wherein the two pole coil unit comprises a ring-like ferrite core disposed around the neck portion of the cathode ray tube and two coil portions wound around projections projecting inwardly from the inner periphery of the ring-like ferrite core.

12. A color cathode ray tube display device according to claim 4, wherein the two pole coil unit is held in a holder mounted on the neck portion of the color cathode ray tube.

13. A method of adjusting color purity of a color cathode ray tube display device comprising:

a step of obtaining data of directions of mislanding for each position on a picture plane by using a mislanding measuring means, a step of calculating a quantity of adjustment on a convergence purity assembly, a quantity of adjustment on the position of a deflection yoke and quantities of currents to be supplied to a two pole coil unit and a purity coil on the basis of the data, and a step of supplying the currents to the two pole coil unit and the purity coil on the basis of a result of the calculation.

14. A method of adjusting color purity of a color cathode ray tube display device according to claim 13 further comprising the steps of:

determining a ratio of currents to be supplied to the two pole coil and purity coil on the basis of mislanding at positions of the picture plane; and supplying the determined ratio of currents to the two pole coil unit and purity coil.

* * * * *